June 22, 1965   SAKAE FUJIMOTO   3,190,202
SAFETY DEVICE FOR SECURING AGAINST INADVERTENT OPENING OF THE
REAR COVER OF A PHOTOGRAPHIC CAMERA AND AGAINST
INADVERTENT SHUTTER RELEASING
Filed Sept. 5, 1963
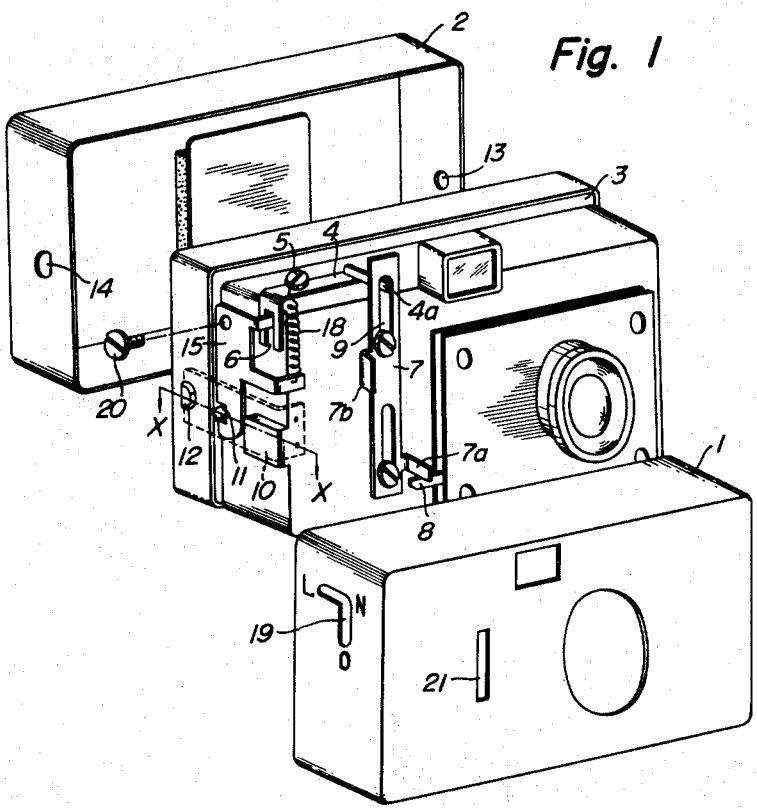

3,190,202
SAFETY DEVICE FOR SECURING AGAINST INADVERTENT OPENING OF THE REAR COVER OF A PHOTOGRAPHIC CAMERA AND AGAINST INADVERTENT SHUTTER RELEASING
Sakae Fujimoto, Chofu-shi, Tokyo, Japan, assignor to Kabushiki Kaisha Ricoh, Ota-ku, Tokyo, Japan, a corporation of Japan
Filed Sept. 5, 1963, Ser. No. 306,729
Claims priority, application Japan, Sept. 6, 1962, 37/51,078
1 Claim. (Cl. 95—11)

This invention relates to safety devices for photographic cameras and particularly to those for photographic cameras of the type including a rear cover adapted to fit over the peripheral wall of the camera body. The present invention is intended to provide a novel safety device including a single operating member for securing against inadvertent opening of the rear cover of a camera and also against shutter releasing operation as caused by inadvertent engagement of some exterior object with the shutter device in its charged position. The safety device of the present invention is particularly valuable when used in cameras in which the film winding and shutter cocking operations are sequentially effected in an automatic fashion by spring or motor means immediately after the picture-taking operation for each frame of the film loaded.

The present invention will now be described with reference to the accompanying drawing, which illustrates one embodiment of the invention and in which:

FIG. 1 is an exploded perspective view of the camera with the front ornamental cover and the rear cover detached from the camera body to show the safety device incorporated in the camera;

FIG. 2 is a fragmentary horizontal cross section taken along the line X—X in FIG. 1 but showing the front and rear covers assembled on the camera body in their respective normal positions; and FIG. 3 is a perspective view of the floating member forming one of the major parts of the present device.

Referring to the drawing, the camera includes a body 3 and a covering comprised of a front ornamental cover 1 and rear cover 2, both taking the form of an open box. In the assembled state, the covers are fitted over the peripheral wall of the camera body with the peripheral walls of the covers abutting against each other. The periphery of the front half portion of the camera body 3 is more or less recessed along at least one lateral side (left-hand side as viewed in FIG. 1) and the top side thereof. Arranged on the top left corner of the recessed portion of the camera body 3 is an L-shaped lever 4 with its horizontal leg portion pivoted at an appropriate point intermediate its ends to the top surface of the recessed body portion by stud means as indicated at 5. Projecting forwardly from the end of the horizontal arm of the lever 4 is an integral lug 4a for the purpose of securing against misoperation of the shutter device. The angular depending arm of the lever 4 is formed at its bottom end with a bifurcation or a vertical slot 6.

Mounted on the front face of the camera body 3 is a vertically slidable bar 7 which has an integral lug 7a overlying the shutter release lever 8 of the camera. When the shutter is charged, the lever 8 is positioned at the top end of its range of rocking movement so as to hold the slider bar 7 in its raised position, as shown in FIG. 1. The lug 4a of the lever 4 is movable into and out of the top end portion of one of the vertical slots 9 formed in the slider bar 7.

A resilient strip 10 is riveted at its one end to the inside of the camera body so as to extend horizontally along the left-hand side wall thereof as viewed in FIG. 1 and carries two lugs 11 and 12 loosely extending through respective apertures formed in the adjacent side wall of the camera body. One of the lugs 11 is rounded at its extremity and projects beyond the recessed wall portion of the camera body while the other lug 12 is slightly longer than the lug 11 and has a beveled end face normally outwardly beyond the periphery of the rear half portion of the camera body. In assembling the rear cover 2, it is first brought to the camera body so that an aperture 13 formed in the right-hand side wall of the cover 2 is engaged by a projection (not shown) formed on the right-hand side wall of the camera body and then the cover is tightly fitted over the periphery of the camera body 3. On this occasion, the beveled end of the lug 12 on the strip 10 is first forced entirely into the associated aperture in the camera body by the adjacent side wall of the rear cover 2 against the resilience of the strip 10 and then released to enter an aperture 14 formed in the side wall of the cover 2 when the aperture 14 is aligned with the lug to securely lock the rear cover 2 on the camera body. In place of the aperture 13 in the rear cover and cooperating lug on the camera body, means may conventionally be provided to hinge the right-hand side wall of the rear cover 2 to the adjacent portion of the camera body 3.

A floating member 15 is arranged along the left-hand side surface of the recessed half portion of the camera body 3 toward the top thereof. As clearly shown in FIG. 3, the floating member 15 is punched from sheet metal and is generally F-shaped having parallel lateral arms 15a and 15b turned at right angles in the same direction. A threaded bore 16 is formed in the top corner portion of the floating member 15 and a notch 17 is formed in the vertical leg portion thereof along its outer edge. The upper edge 15c of the notch 17 is beveled inwardly upwardly as seen in FIG. 3. When assembled, the floating member 15 is arranged with its body extending along the adjacent side of the camera body as illustrated in FIG. 1 and the upper arm 15a extends inwardly through the slot 6 in the lever 4. The lower arm 15b is biased upwardly by a tension spring 18 arranged between the arm and the top of the camera body 3. The notch 17 in the vertical leg of the floating member 15 is positioned to embrace the rounded end of the lug 11 formed on the resilient strip 10, as clearly shown in FIGS. 1 and 2. Subsequently, when the front ornamental cover 1 is attached to the front portion of the camera body 3 with the floating member 15 held in the assembled position thereon, floating member is embraced between the outside surface of the recessed camera body portion and the adjacent side wall of the front cover 1 for pivotal and vertical bodily movements in the general plane of the floating member, as will be described below. The left-hand side wall of the front cover 1 as viewed in FIG. 1 is formed with an inverted L-shaped slot 19 and a headed screw stud 20 is loosely fitted through said slot 19 from the exterior of the camera to be engaged in the threaded bore 16 in the floating member 15.

With the front and rear covers 1 and 2 assembled on the camera body 3, and if the headed stud 20 is positioned in the rear end (as indicated by L) of the inverted L-shaped slot of the front cover 1, the L-shaped lever 4 is rotated so that its depending arm carrying slot 6 is moved rearwardly by the upper lateral arm 15a of the floating member 15 to cause the lug 4a on the horizontal arm of the lever 4 to enter the top portion of the upper vertical slot 9 in the slider bar 7, as shown in FIG. 1. A bent lug 7b is formed on a portion of the slider bar 7 to extend forwardly through a vertical slot 21 formed in the front wall of the front cover 1 and serves the purpose of receiving the drive force for shutter operation. With parts positioned as shown in FIG. 1, however, the slider bar 7 cannot be lowered even under the drive force acting upon the lug 7b and thus the charged shutter-release lever 8 is effectively prevented from being lowered to operate the shutter.

If the headed stud 20 is shifted along the inverted L-shaped slot 19 to its bent portion N, the floating lever 15 is rotated inside the adjacent wall of the cover 1 about the rounded head of the lug 11 on the resilient strip 10 and the lever 4 is rotated counterclockwise as viewed in FIG. 1 about the pivot stud 5 by the upper arm 15a of the floating lever 15 so that the lug 4a on the lever 4 is rearwardly moved out of the vertical slot 9 in the slider bar 9 to allow the latter to descend under a force acting upon the lug 7b thereon.

If the headed stud 20 is subsequently lowered along the vertical portion of said inverted L-shaped slot 19 in the front cover 1, the floating member 15 is also lowered against the bias of the hanger spring 18 so that the upper beveled edge of the notch 17 in the floating member acts to force the rounded head of one of the lugs 11 on the resilient strip 10 into the camera body while simultaneously causing the head of the other lug 12 to retract inwardly out of the locking aperture 14 formed in the rear cover 2 to allow the latter to be opened.

The lower lateral arm 15b of the floating member 15 may take any desired form other than one illustrated as long as the floating member has a tendency to rise along the inside of the front cover 1 under the bias of an appropriate spring means.

It will be appreciated from the foregoing that the safety device is advantageous in that it can serve the purposes of securely locking the rear cover of a camera and preventing any inadevertent operation of the shutter charged by employing a single operating member in the form of a floating lever.

What is claimed is:

A safety device for a photographic camera of the type including a rear cover adapted to fit over the peripheral wall of the camera body, comprising a resilient strip secured at its forward end to the camera body so as to extend rearwardly along the inside of the peripheral wall of the camera body, a first lug formed on the outside of said resilient strip, a second lug formed on the outside of said resilient strip in a position forwardly spaced from said first lug, apertures formed in the periperal wall of the camera body to loosely receive said first and second lugs, said first lug normally extending outwardly through one of said apertures to engage the rear cover of the camera, an upwardly spring-biased floating member arranged along the adjacent side of the camera body and formed with a recess to receive the outer extremity of said second lug on said resilient strip, a lever pivoted intermediate its ends to the top surface of the camera body and having one arm associated with a portion of said floating member, a projection formed on the other arm of said lever for releasable engagement with the vertically slidable shutter-releasing bar of the camera, and means for operating said floating member from the exterior of the camera selectively to rotate said lever associated with said floating member and to force said lugs formed on said resilient strip into said respective apertures in the peripheral wall of the camera body.

No references cited.

JOHN H. HORAN, *Primary Examiner.*